United States Patent [19]

Nemoto et al.

[11] Patent Number: 4,581,670

[45] Date of Patent: Apr. 8, 1986

[54] FLEXIBLE MAGNETIC DISC CASSETTE WITH A SLIDABLY MOUNTED SHUTTER

[75] Inventors: Tsuneo Nemoto, Sendai; Kazuo Ozawa; Tetsuo Sawa, both of Tagajo, all of Japan

[73] Assignee: Sony Corporation, Tokyo, Japan

[21] Appl. No.: 443,936

[22] Filed: Nov. 23, 1982

[30] Foreign Application Priority Data

Nov. 25, 1981 [JP] Japan ............................. 56-175267[U]

[51] Int. Cl.$^4$ ...................... G11B 23/03; G11B 5/012; G11B 5/016; B65D 85/30
[52] U.S. Cl. ......................... 360/133; 360/97; 360/99; 206/444
[58] Field of Search ................... 360/97, 99, 133, 135; 206/444, 387

[56] References Cited

U.S. PATENT DOCUMENTS 4,266,784 5/1981 Torrington .......................... 360/133
4,445,155 4/1984 Takahashi et al. .................... 360/97

*Primary Examiner*—Stuart N. Hecker
*Assistant Examiner*—Alfonso Garcia
*Attorney, Agent, or Firm*—Hill, Van Santen, Steadman & Simpson

[57] ABSTRACT

A flexible magnetic disc cassette contains a flexible magnetic disc. The disc cassette carries a slidably mounted shutter which closes or opens head access openings.

The shutter has openings formed therein, and has projections inserted into a groove in the cassette for guiding the shutter.

The edge of the disc cassette supporting the shutter has a plurality of projections which are provided for controlling operation of the shutter in association with the opening and closing operations of the shutter.

7 Claims, 12 Drawing Figures

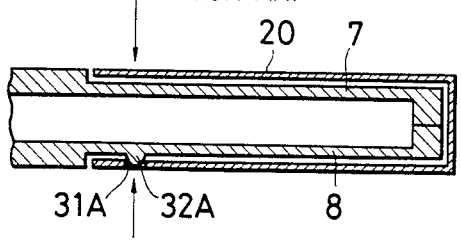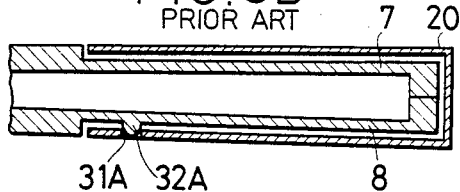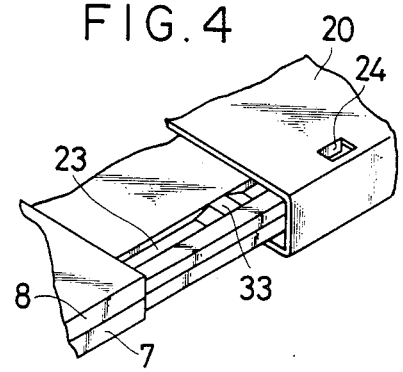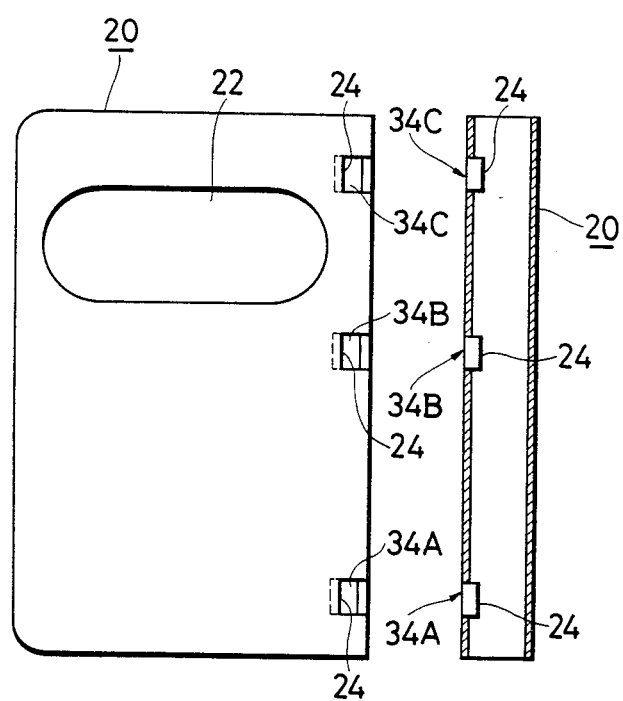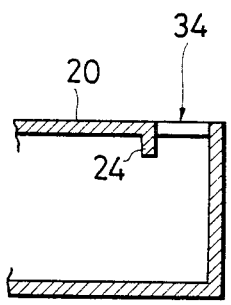

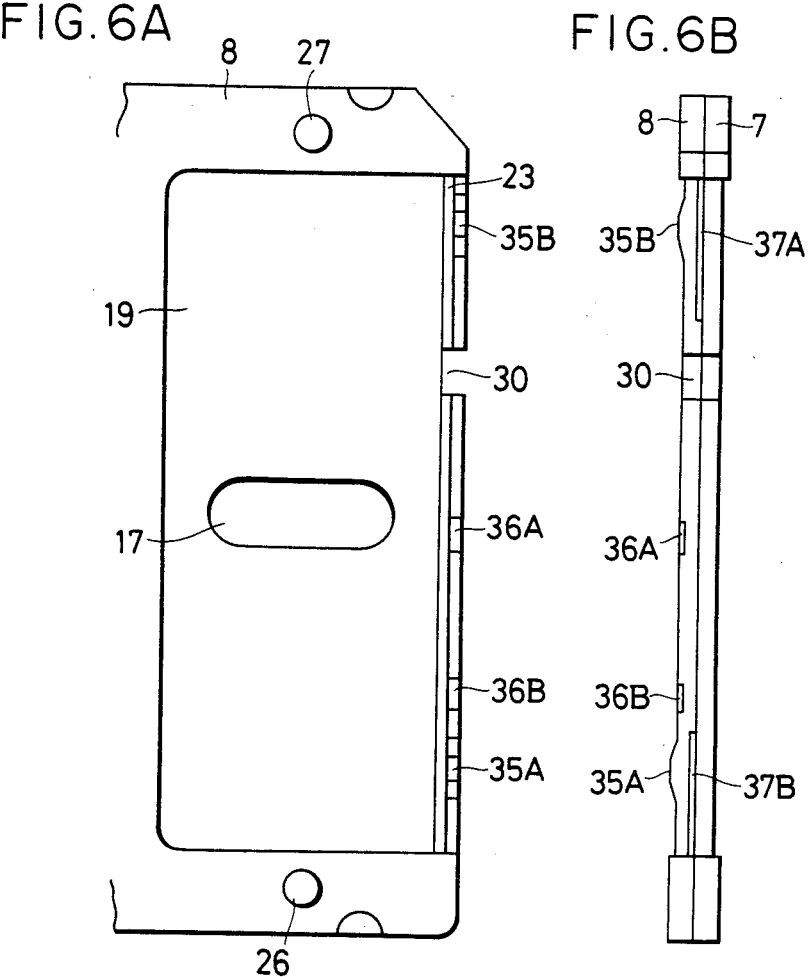
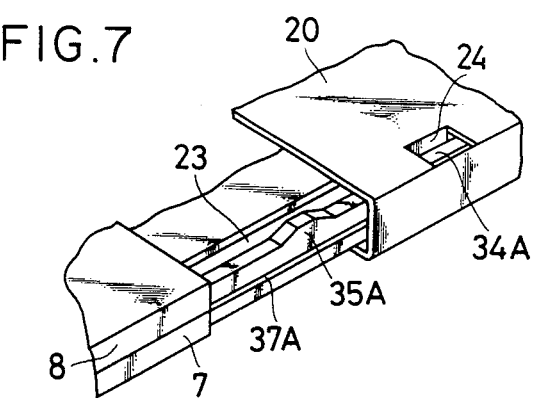

FLEXIBLE MAGNETIC DISC CASSETTE WITH A SLIDABLY MOUNTED SHUTTER

RELATED APPLICATION

This application is related to U.S. application Ser. No. 292,447, now U.S. Pat. No. 4,445,157 of Takahashi filed Aug. 31, 1981, which is assigned to the same assignee of the present invention.

BACKGROUND OF THE INVENTION

The present invention relates to a magnetic disc device wherein a magnetic disc is housed in a casing.

A magnetic disc device as illustrated In U.S. Ser. No. 292,447, now U.S. Pat. No. 4,445,157 will first be described with reference to FIGS. 1, 2A and 2B, in which FIG. 1 is an exploded perspective view of the device and FIGS. 2A and 2B are respectively a top view and a bottom view of the same. Referring to these figures, a flexible magnetic disc 1 consists of a thin, disc-shaped base film of a high polymeric material and a magnetic layer uniformly formed at least on the bottom surface of the base film. A center plate 2 is fitted in a circular hole at the center of the magnetic disc 1 through a ring-shaped double-coated adhesive tape 3. The center plate has a flange 4 and is formed by pressing a thin metal plate. The magnetic disc 1 is adhered to the flange 4. A motor shaft receiving hole 5 of a polygonal shape is formed at the center of the center plate 2. A position regulating pin receiving hole 6 of a rectangular shape is also formed in the center plate 2 at a predetermined distance from the motor shaft hole 5.

The magnetic disc 1 with the center plate 2 is housed within a casing consisting of an upper shell 7 and a lower shell 8. These shells 7 and 8 are injection-molded from, for example, an ABS resin containing an antistatic agent and are adhered together at the peripheries by means of conventional ultrasonic sealing. The center plate is fit with a small clearance into circular opening 9 formed at the center of the lower shell 8. Four arc-shaped ribs 10 extend on the inner surface of the lower shell 8 concentrically with the opening 9, and four arc-shaped ribs which correspond to the above-mentioned ribs 10 are similarly formed on the inner surface of the upper shell 7.

Liners 11 and 12 of unwoven fabric such as rayon are adhered to the inner surfaces of the upper and lower shells 7 and 8 by heat sealing or ultrasonic sealing. The liners 11 and 12 serve automatically to remove dust deposited on the magnetic disc 1 and prevent dropout of signals from the disc during rotation, as well as to prevent abrasion and generation of static electricity of the magnetic disc 1. The liner 12 is adhered on the inner surface of the lower shell over a tongue 13 of a synthetic resin, so that the liner 12 is securely urged against the magnetic surface of the magnetic disc 1.

Elongated head access holes 14, 15, 16, 17 of identical shape are formed in the upper shell 7, the lower shell 8, the liner 11 and liner 12 respectively and extend in the radial direction of the magnetic disc 1. When the upper and lower shells 7 and 8 are joined together, these elongated head access holes are registered with each other. Upon loading the magnetic disc into a magnetic disc recorder, a magnetic head is brought into contact with the magnetic disc 1 through the elongated head access hole 17 formed in the lower shell 8 and the elongated head access hole 16 formed in the liner 12. Similarly, a head pad is inserted into the elongated head access hole 14 formed in the upper shell 7 and into the elongated head access hole 15 formed in the liner 11.

Recesses 18 and 19 are formed on those parts of the upper and lower shells 7 and 8 which include the elongated head access holes 14 and 17, respectively. A U-shaped aluminum shutter 20 which has openings 21 and 22 of the same shape as that of the elongated holes 14 to 17, is slidably mounted such that it clips into the recesses 18 and 19.

As shown in FIG. 2B, a guide groove 23 is formed along the side edge of the lower shell 8. Three protuberances 24 project inwardly from the shutter 20 to cooperate with the guide groove 23. Therefore, the shutter 20 is guided along the guide groove 23 between the operating state and the non-operating state. Referring to FIGS. 2A and 2B, in the operating state, the shutter 20 is moved to the position where the edge thereof coincides with the side walls on one side of the recesses 18 and 19. Thus, the elongated holes 16 and 17 for head insertion, the elongated holes 14 and 15 for head pad insertion, and the holes 21 and 22 are all registered as indicated by the solid lines, and the magnetic disc 1 is exposed therethrough. On the other hand, in the non-operating state, the shutter 20 is moved to the position where the edge thereof coincides with the side walls on the other side of the recesses 18 and 19. In that condition, the elongated holes 14 to 17 are closed and the magnetic disc 1 is covered by the shutter 20, as indicated by the dotted line. In this manner, the shutter 20 serves to protect the magnetic disc 1 and prevent introduction of dust. Notch 30 is formed on the position corresponding to the edges of the upper and lower shells 7 and 8, this notch 30 is arranged to be opened or closed depending on the sliding of the shutter 20. The notch 30 is made open only when the shutter 20 is open, in other cases it is closed. The notch 30 is used for detecting the shutter position so as to enable the loading of the magnetic disc device into a disc recorder only when the shutter 20 is open.

An erroneous erasure prevention lug 25 is further arranged at one corner of the lower shell 8. Information recorded on the magnetic disc 1 is protected if the lug 25 is removed. As shown in FIG. 2B, a pair of positioning holes 26 and 27 are formed at two corners of the lower shell 8 for positioning the magnetic disc device in a disc recorder. At the other two corners of the lower shell 8, holes are not formed, but positions 28 and 29 indicated by hatched lines in FIG. 2B serve as reference surfaces. Thus, the magnetic device is supported at the reference position with reference to the four points. In this state, the magnetic disc 1 is rotated by a motor to record or reproduce digital signals or analog signals.

Small holes 31A and 31B are formed on the opposite corners from the protuberances 24 of the shutter 20 as mentioned above, as shown in FIG. 2B. On the other hand, small hemisphere-shaped projections 32A and 32B are formed in the recess 19 of the lower shell 8. In the opening position of the shutter 20, the projection 32A enters the small hole 31A. Similarly in the closing position of the shutter 20, the projection 32B enters the small hole 31B. This engagement of the projection 32A and the hole 31A or of the projection 32B and the hole 31B causes a detent, or click effect between the casing and the shutter, securing them in the relatively fixed condition. FIGS. 3A and 3B show sectional side view of the shutter 20 and a part of the casing in the opening state. In FIGS. 3A and 3B, the magnetic disc 1, liners 11 and 12, etc. to be enclosed in the shell are not shown.

In such a magnetic disc device, however, the click effect occurs near the center of the shell, so that such a portion near the center of the lower shell 8 is so flexible that the upper and lower shells 7 and 8 must be strongly sandwiched by the shutter 20 for sufficient click effect. To be concrete, the upper and lower shells 7 and 8 are strongly and elastically sandwiched by the shutter 20 by using the shutter 20 whose opening width is smaller than the distance between the outermost surfaces of upper shell 7 and lower shell 8. As shown in FIG. 3B, the sandwiching force of this shutter 20 in the directions indicated by the arrows in FIG. 3A causes the shells 7 and 8 to be warped inwardly. Therefore, the distance between both shells 7 and 8 near the center of the magnetic disc device becomes narrow, so that the smooth rotation of the center plate 2 (and a magnetic disc) disposed at the opening 9 of the shells 7 and 8 may be impossible. This results in the overload of the motor on rotating the magnetic disc 1. In the worst case, the failure of rotation of the magnetic disc may also occur.

To avoid such problems, the present applicant has proposed a magnetic disc device which has a construction as shown in FIG. 4 in which a clicking projection 33 is formed in the guide grooves 23 at both ends within the range where the protuberances 24 of the shutter 20 can slide. In such a casing, since no click portion is formed at the center of the shell, enough click effect can be obtained without any deformation of the shells. Thus, it is possible to prevent the overload on rotating the magnetic sheet or a failure of rotation thereof. However, increase in the number of sliding operations of the shutter 20 causes the projection 33 to be scraped off by the protuberances 24, resulting in loss of the initial clicking force. There is also a problem in which a stable click force is not obtained since the heights of the protuberances are not uniform.

SUMMARY OF THE INVENTION

It is therefore an object of the present invention to provide a magnetic disc device with a click system of the shutter by which such problems as described previously can be solved.

It is another object to provide a magnetic disc device in which deformation of the shells is prevented, and abrasion of the projections is reduced and a stable clicking force is obtained.

For this purpose, there is provided a magnetic disc device comprising a flexible magnetic disc, a cover having an upper shell and lower shell containing the flexible magnetic disc, a shutter slidably mounted on the cover, the shutter being slid on the cover between an operative position and inoperative position, at least one projection provided on an edge of the case, and a plurality of cooperating devices provided on the shutter for holding said shutter at the open or closed positions.

BRIEF DESCRIPTION OF THE DRAWINGS

The invention will be better understood from the following description with reference to the accompanying drawings, in which:

FIGS. 3A and 3B are cross sectional side view of a conventional magnetic disc device in which FIG. 3B shows the deformation of the magnetic disc device;

FIG. 4 is a perspective view of a part of a conventional device;

FIGS. 5A, 5B and 5C are a plan view and sectional views of the shutter of an embodiment of the device;

FIGS. 6A and 6B are a plan view and a side view of a part of the present device; and FIG. 7 is a perspective view of a part of another embodiment of the invention.

DESCRIPTION OF THE PREFERRED EMBODIMENT

In FIGS. 5A, 5B and 5C, holes 34A, 34B and 34C are formed in the peripheries of the three protuberances 24. The portions between each protuberance 24 and the folded edge of the shutter 20 have been punched. In this case, the holes 34B locating at the center may not be formed since it does not contribute to the click effect.

Figure 1:
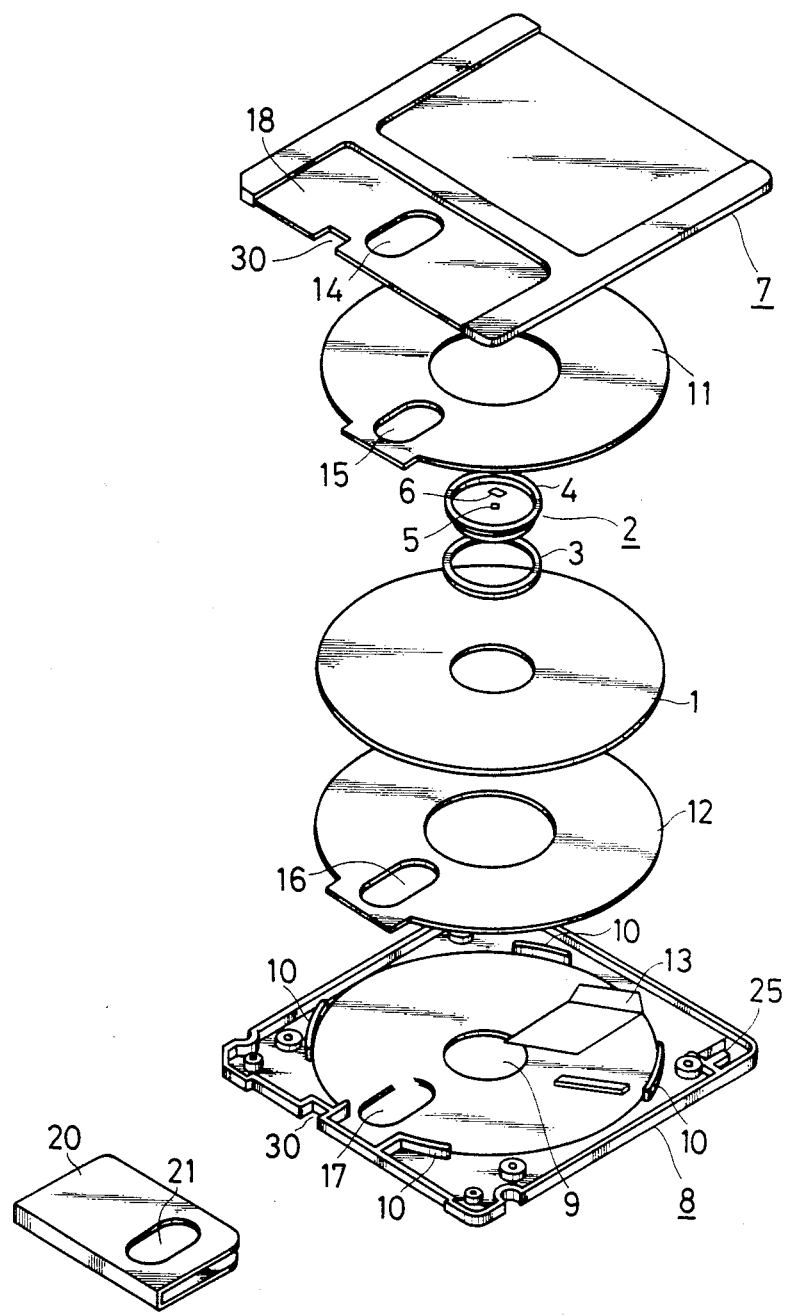
FIG. 1 is an exploded perspective view of maqnetic disc device to which the invention can be employed.
Figure 2A:
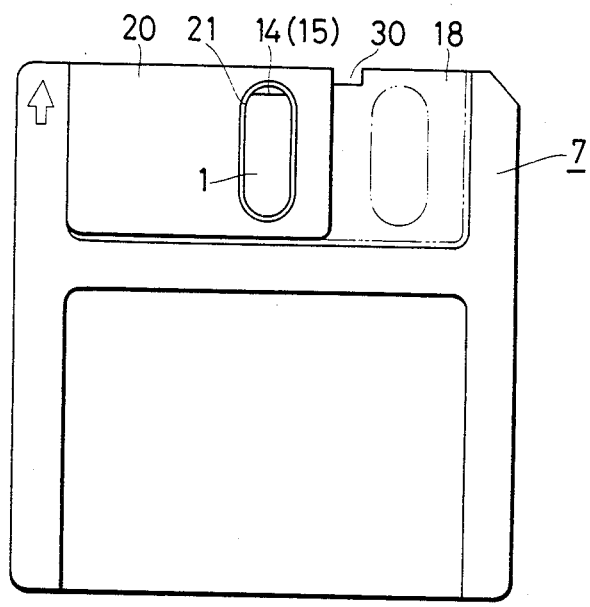
FIGS. 2A and 2B are a top view and a bottom view of an example of a magnetic disc device to which the invention can be applied.
Figure 2B:
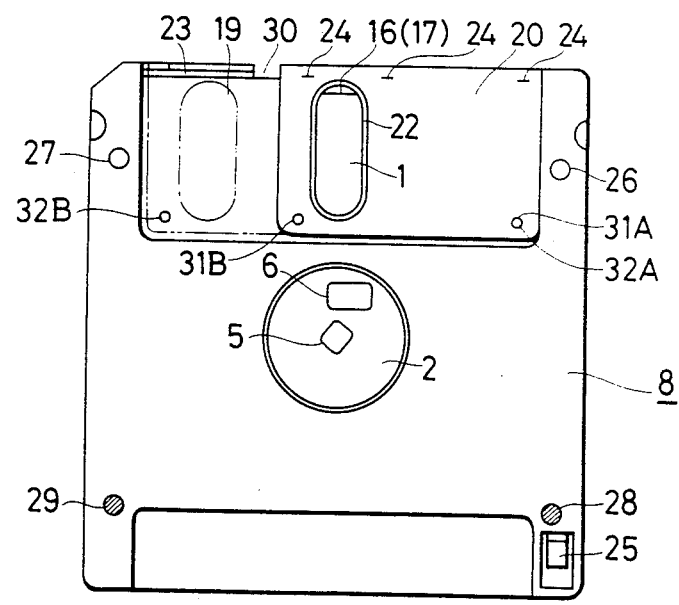

On the other hand, such clicking projections 35A and 35B as shown in FIG. 6A and FIG. 7 are formed at the periphery between the guide groove 23 of the lower shell 8 and the edge of the lower shell 8. (In FIG. 6, the magnetic disc 1 and liners 11 and 12, etc. are omitted for simplifying the figures.) These projections 35A and 35B have such dimension that they can enter and engage with the holes 34A and 34B as shown in FIG. 7, and both edges thereof have oblique sections. Round edges may be also possible instead of the slant edges. The projection 35A is formed at the position near the center of the protuberance 24 which is at the nearest position of the side which abuts upon one side wall of the recess 19 when the shutter 20 is in such an open state (i.e. the operating position) as shown in FIG. 2. While the shutter 20 is in the closed position (i.e. non-operating position), the projection 35B is formed at the position near the center of the protuberance 24 which is at the nearest position of the side which abuts upon the other side wall of the recess 19. Recesses 36A and 36B are formed at the same level as the guide groove 23 in FIG. 6. The recesses 36A and 36B are formed at the positions which coincide with the positions of the protuberances 24 when the shutter 20 locates between the recesses 18 and 19 and when the side of the shutter 20 does not abut upon either of the side walls of the recesses 18 and 19; that is to say, in the case where the device is in neither of the opening and closing states. The notch 30 also serves as a gutter for attaching the shutter 20.

Slits 37A and 37B are further formed at the positions where the projections 35A and 35B have been formed in the front side of the casing consisting of the upper and lower shells which have been joined together as shown in FIG. 6B. These slits serve to provide elasticity in the depth direction to the lower shell 8 at the edge where the guide groove 23 has been formed. The opening width of the respective slits 37A and 37B is set to, for example, 0.2–0.4 mm. The slits 37A and 37B are so formed as to remove a part of the edge of the lower shell 8 which abuts against the upper shell 7. Inner ribs or the like are formed for prevention of introduction of dust from the slits 37A and 37B. (Such inner ribs are not shown in FIG. 6B).

FIG. 7 shows the state in which the shutter 20 has been inserted into the shells 7 and 8. As understood from FIG. 7, upon moving the shutter 20 to the operating position or non-operating position, the shutter 20 is raised and the lower shell 8 is simultaneously pressed slightly and downwardly. Thus, the projection 35A and the hole 34A, or the projection 35B and the hole 34B are brought into engagement with each other. This click effect allows the shutter 20 to be securely positioned relative to the magnetic disc casing.

As understood from the above description of the present invention, with such a construction of the magnetic disc cassette, it is possible to reduce the abrasion of the projections, as well as to avoid the problem of the unstable clicking, or detent, force that resulted from the unbalanced heights of the protuberances, since the click effect is not obtained by a method in which the protuberances pass over the projections for engagement. There is a further advantage in which a sufficient click effect can be obtained without any interfering deformation of the shell, because the click system has been provided on the periphery of the shells, whereby smooth, non-binding, rotation of the magnetic disc is assured.

With this detailed description of the specific device used to illustrate the preferred embodiment of the present invention, it will be obvious to those skilled in the art that various modifications and rearrangements can be made in the present click system and device described herein without departing from the spirit and scope of the invention which is limited only by the appended claims.

We claim as our invention:

1. A flexible magnetic disc cassette comprising:
   a flexible magnetic disc;
   a case having an upper shell and lower shell containing said flexible magnetic disc;
   a shutter slidably mounted on said case with a surface thereof adjacent to and slideable along one edge of said case said one edge being defined by the peripheral abutting surfaces of said upper and lower shells, and being slideable between an open position in which the cassette is operative and a closed position in which the cassette is inoperative,
   resilient projection means provided on said case adjacent said one edge of said case; and
   interference means provided on said shutter surface cooperating with said resilient projection means for holding said shutter at said two positions in association with said projection means, whereby the indicated holding is occasioned external of the disc perimeter.

2. The flexible magnetic disc cassette as set forth in claim 1, wherein said case has a groove which extends along said one edge thereof and projections are provided on said shutter and are inserted in said groove for slidably guiding said shutter on said cover along said one edge.

3. The flexible magnetic disc cassette as set forth in claim 2, wherein said shutter has a pair of plates which sandwich said cover.

4. The flexible magnetic disc cassette as set forth in claim 3, wherein said shutter is made of metal plate and said interference means and projections provided on said shutter are simultaneously formed by pressing and folding portions of said shutter.

5. The flexible magnetic disc cassette as set forth in claim 4, wherein there are provided spaces between the upper shell and the lower shell of said cover at positions corresponding to said projections in order to provide resilience to said projection means.

6. A cassette according to claim 1 wherein said projection means comprises resilient angled surfaces and said interference means comprises a pair of openings adjacent the edge of said shutter.

7. A cassette according to claim 6 wherein said angled surfaces are substantially spaced along said one edge.

* * * * *